US009632892B1

United States Patent
Sledz et al.

(10) Patent No.: US 9,632,892 B1
(45) Date of Patent: Apr. 25, 2017

(54) NFS CLUSTER FAILOVER

(71) Applicant: EMC Corporation, Hopkinton, MA (US)

(72) Inventors: Daniel J. Sledz, Seattle, WA (US); Brett Johnson, Kirkland, WA (US); John Michael Hayden, Holliston, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 88 days.

(21) Appl. No.: 14/673,441

(22) Filed: Mar. 30, 2015

(51) Int. Cl.
G06F 11/00 (2006.01)
G06F 11/20 (2006.01)
G06F 17/30 (2006.01)

(52) U.S. Cl.
CPC ...... *G06F 11/2094* (2013.01); *G06F 11/2023* (2013.01); *G06F 17/30174* (2013.01); *G06F 17/30194* (2013.01); *G06F 2201/805* (2013.01)

(58) Field of Classification Search
CPC .......... G06F 11/2056–11/2094; G06F 11/2023–11/2033; G06F 17/30174; G06F 17/30194; G06F 2210/805
See application file for complete search history.

(56) References Cited

U.S. PATENT DOCUMENTS

| 6,684,243 B1 * | 1/2004 | Euget ............... H04L 29/12783 709/203 |
| 2003/0182312 A1 * | 9/2003 | Chen ................... G06F 11/1435 |
| 2008/0010485 A1 * | 1/2008 | Shitomi .............. G06F 11/2092 714/3 |

* cited by examiner

*Primary Examiner* — Jason Bryan
(74) *Attorney, Agent, or Firm* — Krishnendu Gupta

(57) ABSTRACT

Implementations are provided herein for establishing a failover cluster in a distributed file system that upon the occurrence of failover event, allows clients to actively migrate during ongoing file system activity from a source cluster to a target cluster without having to unmount an NFS export from the source cluster and remount the NFS export on the target cluster. Upon the occurrence of a failover event, clients can be rerouted to a target cluster that contains mirrored copies of the data the client was expecting to be stored on the original source cluster. However, in attempting to access the data, without unmounting and remounting an export, the client will continue to reference source cluster FSID and LIN identifiers when making NFS calls to the target cluster. Thus, implementations are provided herein for translating the requests of an NFS client on a target cluster after a failover event has occurred. A client can make NFS calls using FSID and LIN information of the original source cluster, and that information can be translated, e.g., through a reverse LIN map, to the unique LIN's of the target cluster, such that any failover migration of the client is transparent to the client.

17 Claims, 10 Drawing Sheets

NFS CLUSTER FAILOVER

FIELD OF THE INVENTION

This invention relates generally to accessing stored data, and more particularly to systems and methods for failing over NFS clients from a source cluster to target cluster.

BACKGROUND OF THE INVENTION

Distributed file system offer many compelling advantages in establishing high performance storage environments. One example is the ability for the distributed file system to offer storage to clients using multiple different protocols. For example, in a distributed file system consisting of a cluster of nodes, individual nodes can respond to multiple clients concurrently, and those clients can be communicating with the node using protocols such as Network File System ("NFS"), Server Message Block ("SMB"), Hadoop Distributed File System ("HDFS"), etc. One advantage of some distributed file systems is the ability of a client to connect to any node of the file system and have that node able to respond to file system operations. Thus, if a single node or less than a quorum of nodes suffers a failure, the client can, in general, transparently connect to a remaining active node to continue desired file system operations.

Some distributed file systems can also regularly sync with a backup cluster of nodes. The backup cluster of nodes can operate as an independent file system to the primary cluster of nodes. Data can be cloned on the backup cluster of nodes and periodically updated to include changes made on the primary cluster of nodes. In some file systems, the backup cluster of nodes can also serve as a failover cluster. The failover cluster can be used when the primary source of nodes suffers a cluster failure, or conceivably any adverse performance conditions, making it desirable to migrate clients from the primary cluster of nodes to the backup cluster of nodes, for immediate use by a set of existing clients. One challenge is that when a source cluster of nodes becomes inaccessible, and clients are failed over to a target cluster of nodes, clients can suffer from instability in that the target cluster may be unable to recognize protocol operations made by a client that still expects to be connected to the source cluster of nodes. For example, in an NFS environment, clients can be forced to unmount the source cluster and remount the target cluster upon the failover, which may or may not be transparent to the client. This can also cause delays to the client experience during the migration. Therefore there exists a need to provide a means to failover clients using an NFS protocol to a target cluster of nodes transparently that doesn't require an unmount and a remount.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a connection can be established between an NFS client and a source cluster, wherein the source cluster is associated with a first static internet protocol ("IP") address and a dynamic IP address, wherein the connection is an NFS connection associated with an NFS export, and an access zone, wherein the NFS export is associated with a set of source files and directories, wherein the set of source files and directories are associated with an FSID; wherein files and directories among the set of source files and directories are associated with a unique source logical mode ("LIN"). A connection can be established between the source cluster and a target cluster, wherein the target cluster is associated with a second static IP address. The target cluster can be synced with the source cluster by dynamically mirroring the set of source files and directories in the target cluster as a set of mirrored files and directories, wherein the set of mirror files and directories are associated with a target access zone, wherein the target access zone is associated with the NFS export, wherein mirrored files and directories among the set of mirrored files and directories are associated with a unique target cluster LIN; and dynamically generating and updating a reverse LIN map on the target cluster wherein unique target cluster LINs of mirrored files and directories among the set of mirrored files and directories are mapped to unique source cluster LINs of files and directories among the set of files and directories.

In accordance with another aspect, a failover of the client from the source cluster to the target cluster can be triggered, wherein the triggering disconnects the client from the source cluster. The dynamic IP address associated with the NFS access zone can be assigned to the target cluster. A connection can be established between the NFS client and the target cluster based on the dynamic IP address, wherein establishing the connection does not include mounting the NFS export on the target cluster.

In accordance with another aspect, a failback of the client from the target cluster to the source cluster can be triggered. The dynamic IP address associated with the NFS access zone can be assigned to the source cluster. The source cluster can receive a change log associated with a set of transactions made between the NFS client and the target cluster. The set of transactions can be performed on the source cluster, wherein performing the set of transactions includes mirroring a set of write data associated with the set of transactions on the source cluster. The reverse LIN map can be updated based on the performed set of transactions. A connection can be established between the NFS client and the source cluster based on the dynamic IP address, wherein establishing the connection does not include mounting the NFS export on the target cluster.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
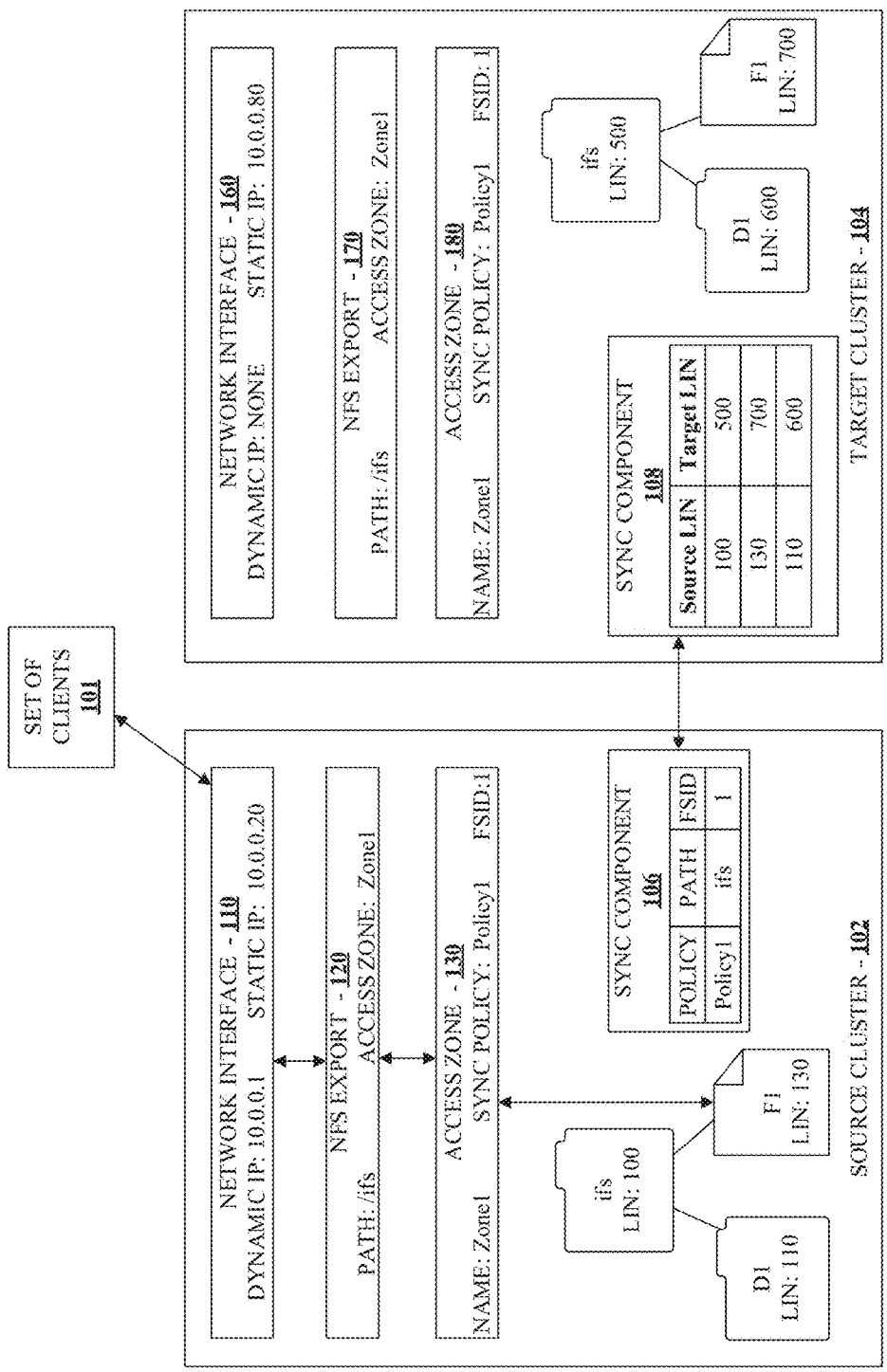
FIG. 1 illustrates an example source cluster and target cluster prior to any failover event in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "mode" or "logical mode" ("LIN") as used herein refers to an in-memory representation of on-disk data structures that may store information, or metadata, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "mode" or LIN may be absent, but file systems may have data structures that store data similar to LINs and may provide capabilities similar to LINs as described herein. It can be appreciated that the concepts and implementations as provided herein are functional using data structures not termed LINs or modes but that offer the same functionality to the file system.

The term "Access Zone" as used within this specification refers to a form of multi-tenancy that effectively partitions a single file system into trees that can act like distinct separate file systems to connected clients. Different access zones can have separate non-overlapping root directories, and can be affiliated with a distinct protocol. For example, each network file system ("NFS") export can be affiliated with a unique access zone. It can be appreciated that an admin access zone can be established for the root directory of the entire file system that can encompass all other access zones of the file system. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

It can be appreciated that individual system calls need not be access zone aware to effectuate multi-tenancy. For example, an access daemon, such as a local security authority subsystem service ("LSASS") or a generic security subsystem that functions as an extension of the trusted computing base to handle authentication and identity, can assign access zone information to a token that is then assigned to an incoming network connection. The access daemon can then be used during each system call made by the incoming network connection to expose or deny access to network resources based on the zone information in the token assigned to the network connection. Along with an access daemon, in some implementations, other zone aware applications of an operating system can include network interface daemons such as those relating to server message block ("SMB") resources, NFS resources, Hadoop distributed file system ("HDFS"), and other network protocol or interface daemons depending on the functionality offered by the distributed file system. It can be appreciated that system calls and basic file system operating commands do not need to be access zone aware in implementations of the disclosure. Zone information becomes a container for file system configuration information. For example, where file system settings were in the past defined cluster wide, those settings can now be scoped instead to access zones. Daemons can then act on that information based on the access zone information within an associated token, and make configuration choices based on the information containing within the token.

The term "FSID" as used within this specification refers to a property of NFS that is essentially an NFS identifier that is used to identify each file system that NFS exports. This FSID is used to uniquely identify a file system. Using EMC Isilon OneFS as a base operating system of a cluster of nodes, each cluster of nodes has a unique FSID. In most implementations, the FSID ranges in size from 32 to 64 bits. NFS also has a "File Handle" that is generally 32 to 64 bytes. The file handle can include additional discriminative information beyond the NFS export information, such as a LIN of the path of the NFS export, snapshot identifiers, overarching file system identifiers, etc. It can be appreciated that because the file handle can include LIN information that is unique to the overarching file system, a target cluster, as described in greater detail below, likely has differing unique LIN information associated with its paths than the source cluster. Thus, the implementations as described within the specification provide for a target cluster to maintain usage of a FSID and/or file handles that are unique to the source cluster without intervention by the client.

Implementations are provided herein for establishing a failover cluster in a distributed file system that upon the occurrence of failover event, allows clients to actively migrate during ongoing file system activity from a source cluster to a target cluster. The migration occurs without having to unmount an NFS export from the source cluster and remount the NFS export on the target cluster. It can be appreciated that in mounting an NFS export to the source cluster, NFS clients are aware of an FSID associated with the NFS export, as well as a set of source cluster LIN's associated with the files and directories of the NFS export.

For example, each individual File and Directory is associated with a unique LIN, e.g., a reference data structure within the base file system of the source cluster. When an NFS client wishes to make a read request, for example, of a file within the NFS export, it does so, in part, by referencing the LIN of the file the client is requesting to read. The operating system, using the LIN, can identify the location in block storage where the file data of the file is located.

Upon the occurrence of a failover event, clients can be rerouted to a target cluster that contains mirrored copies of the data the client was expecting to be on the original source cluster. However, in attempting to access the data, without unmounting and remounting an export, the client will continue to reference source cluster FSID and LIN identifiers when making NFS calls to the target cluster. Thus, implementations are provided herein for translating the requests of an NFS client on a target cluster after a failover event has occurred. A client can make NFS calls using FSID and LIN information of the original source cluster, and that information can be translated, e.g., through a reverse LIN map, to the unique LIN's of the target cluster, such that any failover migration of the client is transparent to the client.

It can be appreciated that as described more fully with regards to FIGS. 9 and 10 below, that clusters of nodes can also experience node failure. In the event of a node failure, clients among a cluster of nodes can failover to a different node among the same cluster, and continue to use a source FSID and source LINS to perform file operations, as all nodes among a cluster of nodes operate together in one file system, such as in one implementation, using EMC Isilon OneFS as the base operating system for the cluster of nodes. The subject disclosure relates more specifically to cluster wide failure, such that the entire source cluster of nodes experiences a failure, or some other triggering event occurs, providing for clients to failover to a separate cluster of nodes running a separate instance of the base operating system.

Referring now to FIG. 1, there is illustrated an example source cluster and target cluster prior to any failover event in accordance with implementations of this disclosure. A set of clients 101, in one embodiment, NFS clients, can connect to source cluster 102 via network interface 110. Network interface 110 can accept connections under a set of dynamic internet protocol ("IP") addresses, while source cluster 102 can also maintain a static IP address. For example, as depicted in FIG. 1, the static IP address is 10.0.0.20 and the dynamic IP address for the NFS access zone as discussed in greater detail below is 10.0.0.1. It can be appreciated that based on the IP address that clients use to connect to source cluster 102, a known access zone associated with the IP address can be assigned to the client. For example, while FIG. 1 shows a dynamic IP address of 10.0.0.1 associated with NFS export 120, another dynamic IP address not shown, 10.0.0.5 can be associated with an HDFS protocol and a different access zone. Thus, when a client attempts to connect to IP address 10.0.0.1, it is known they are an NFS client, and an associated access zone with setting unique to NFS are established, and similarly, when a client attempts to connect to IP address 10.0.0.5, they are known as an HDFS client and an associated access zone with settings unique to HDFS are established.

NFS Export 120 associated with Access Zone Zone1 can also establish a path. In one implementation, the path of the NFS export can be both the root directory of the NFS export and the directory in the source cluster 102 file system that corresponds to that root directory. For example, the source cluster can have an operating system and file system capable of serving multiple different protocols. Thus the root directory of the NFS export, the root directory of an SMB share, the home directory of an HDFS, etc., in most implementations, will not be the root directory of the source cluster 102 file system. In one implementation, the source cluster 102 file system can be OneFS, a product of EMC Corporation.

The access zone 130, as defined above, can contain many different settings relating to the clients that connect to the access zone and what types of services the clients are exposed to. For example, settings like snapshots, backup and recovery, mirroring, file privileges, etc. can all be adjusted per access zone. One setting can be a sync policy. A sync policy can be established that determines what files in the access zone should be synched to a backup cluster for failover, backup, redundancy, etc. In one implementation, the policy can call for the entire root directory of the NFS export to be synched to a target cluster. In another implementation, a subset of folders and files of the root directory can be synched. The sync policy can also contain identifiers associated with the source cluster and target cluster, such as a static IP address that allow the sync components 106 and 108 to exchange data, or the FSID associated with the NFS export.

Target cluster 104 can have components similar to that of source cluster 102. Network interface 160 has a differing static IP address, and can be configured to have varying dynamic IP addresses associated with differing access zone. NFS Export 170 can be established to mirror the NFS export 120, in that both have the same Access Zone name (Zone 1) with the same path. Access zone 180 can also mirror access zone 130. In addition, Access Zone 180 can be configured as a failover access zone. A failover access zone can instruct the target cluster 104 that when processing calls from clients to the failover access zone, a translation between source LIN's and target LIN's as described in greater detail below must be made before accessing files on the target cluster 104.

Sync components 106 and 108 can work together, prior to failover, to replicate files and/or directories stored within access zone 130 to access zone 180. For example, the first time that the source cluster 102 access zone 130 is synced, a tree walk can be made over the entire root directory (e.g., path of the NFS export) to copy the files and/or directories to the target cluster 104 access zone 180. After an initial mirroring, a snapshot service of the base file system (e.g., OneFS) can be used to mirror changes after the first tree walk sync as they occur. It can be appreciated that by using snapshots to mirror files and/or directories in the target cluster, network traffic can be minimized as files and/or directories unchanged since the previous snapshot do not need to be recopied. For example, using a copy on write snapshot system, as data is written to the source cluster, that new data can be synced to the target cluster incrementally upon each write, a batch of writes, or upon custom sync or snapshot settings.

As a part of the sync process, a reverse LIN map can be generated on the target cluster 104 and associated with access zone 180. As shown within sync component 108, the reverse LIN map includes, at least in part, a mapping of source LIN's to target LIN's. As LIN's are created and modified on the source cluster 102, sync component 106 can iteratively copy the data to target cluster 104, and once copied to target cluster 104, the unique source LIN of the file or directory is associated with the unique target LIN of the target cluster 104. As shown on FIG. 1, the root directory "ifs" has a source LIN of 100. The "ifs" directory has a child directory D1 with a source LIN of 110 and a child file of F1 with a source LIN of 130. The same files and directories are mirrored to target cluster 104, where target cluster "ifs"

directory has a target LIN of 500, child directory DA has a target LIN of 600 and child file F1 has a target LIN of 700. The reverse LIN map, generated as files and/or directories are copied/updated on the target cluster 104 from source cluster 102, operate to map the source LIN of each file or directory to a target LIN.

Another part of the sync process can be associating the FSID associated with the NFS export 120 and Access Zone 130 on the source cluster with the NFS export 170 and Access Zone 180 on the target cluster.

In one implementation, if the source cluster becomes inoperable during a sync, such that files and/or directories being copied to the target cluster are in an unfinished and unknown state, sync components 106 and 108, alone or in combination, can revert the target cluster to last known good state, such that any changes partially made but not finished during the incomplete sync can revert back to just before the last sync operation began.

Figure 2:
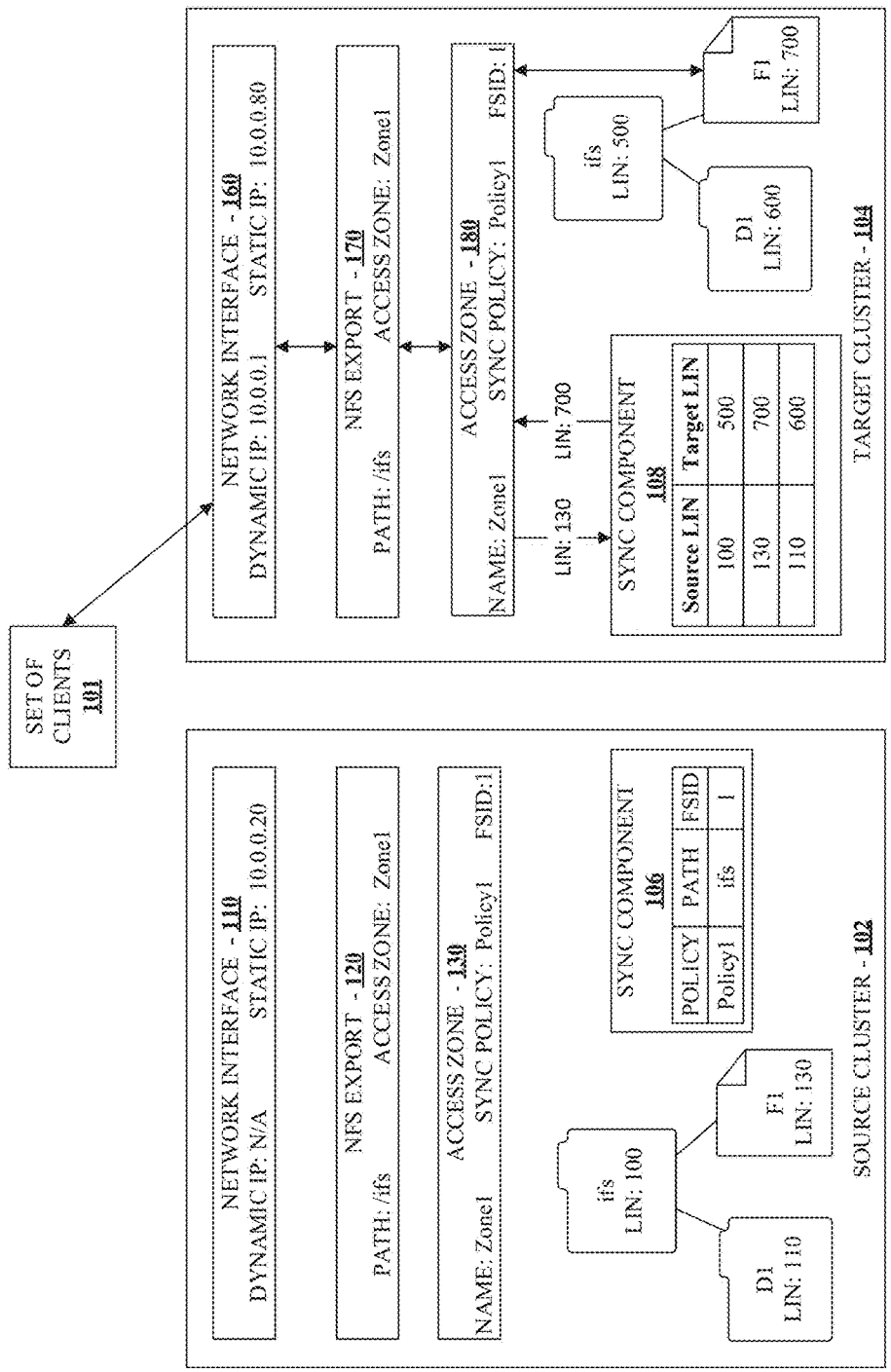
FIG. 2 illustrates an example source cluster and target cluster after a failover event in accordance with implementations of this disclosure.

Referring now to FIG. 2, there is illustrated an example source cluster and target cluster after a failover event in accordance with implementations of this disclosure. In the example depicted, a failover event has triggered an NFS failover. In one implementation, the trigger is a manual trigger made by administrator to both the source cluster and the target cluster. The source cluster can be instructed to renounce the dynamic IP address associated with the access zone and also stop responding to NFS clients. The target cluster 104 can then be activated such that the target cluster network interface 160 is configured to the dynamic IP address previously associated with the NFS access zone on source cluster 102, as shown, 10.0.0.1.

In one implementation, an automated process can be set up that instructs the source cluster to shut down access to the access zone 130. For example, in a source cluster that had 10 nodes, each node would need to be instructed to no longer respond to or acknowledge requests associated with the dynamic IP address of the access zone. The automated process can also instruct the nodes of the target cluster to begin responding to the dynamic IP address. In one implementation, the automated process could block out access to the source cluster at the router, avoiding the need to instruct each individual node of the source cluster, by preventing any traffic from reach the source cluster.

In one implementation, the failover is limited strictly to the Access Zone associated with the NFS mount. For example, the dynamic IP address or addresses associated with the NFS Export 120 can be dropped, such that the source cluster 102 does not receive requests made to these IP addresses. Source cluster 102, however, can have other access zones not depicted for protocols such as HDFS, SMB, Swift, etc. These other access zones have their own dynamic IP addresses and can continue to function even after the NFS access zone and NFS clients have failed over to target cluster 104.

In one implementation, the client will pause when a disruption occurs to their intended target prior to the failover. It can be appreciated that in general, NFS clients will attempt to reconnect in perpetuity until a client connection can be established, or some timeout error period has lapsed, perhaps generating an message by the client due to cluster inactivity/failure.

In one implementation, when an NFS client connects to the target cluster, there is a credential check using credentials that were valid with the source cluster. It can be appreciated that these credentials can be invalidated, e.g., the target cluster rejecting a token from the NFS client. If the token is rejected, the natural NFS mechanisms of dealing with an unknown token can be processed, the client can be authenticated by asking for and receiving a new target cluster token. In one implementation, this process is transparent to the user. In one implementation, the target cluster may prompt a user of the client to prove their identity, for example, to a Kerberos key distribution center ("KDC"). In one implementation, the KDC can require a password, generating a prompt to the user of the client.

In one implementation, upon a failover, sync component 108 is instructed to make the access zone 180 writable. When the access zone is writable to clients of the target cluster, the target cluster first consults the reverse LIN mappings generated by sync component 108 for processing client requests. It can be appreciated that only clients connected to access zone 180 are affected, and that other clients connecting to target cluster 104 in different access zones are not impacted by making access zone 180 writable. It can be appreciated that by making the access zone 180 in the target cluster writable, and the file system consulting the reverse LIN mapping prior to acting on any client request, it can prevent an issue where the target cluster has an existing unique LIN that matches the source LIN of an NFS client request. The target cluster file system will not look to process a request made by an NFS client through a writable access zone until after the mapping has been made.

As shown in FIG. 2, a client is making a request to read a file with a LIN of 130. The access zone 180 being writable after the failover requires that client requests are first mapped using the reverse LIN table, whereby a source LIN of 130 is mapped to a target LIN of 700. The client request associated with target LIN 700 is then processed by the target cluster 104 in a similar manner to which the request would have been processed by source cluster 102 prior to a failover.

In one implementation, a failback can be initiated where after a failover to target cluster 104, source cluster 102 can become available again, and the clients can failback to source cluster 102. Similar to the failover procedure discussed above, the dynamic IP address associated with the NFS access zone can be reinitialized in the source cluster and the target cluster can be prevented from honoring requests to the same dynamic IP addresses. In one implementation, for any files created in the target cluster after the failover, a target LIN is created for the file and the mapping information is updated to include a placeholder source LIN that matches the target LIN, such that any future client request to the target cluster referencing a the placeholder source LIN is mapped to the newly generated target LIN. Sync component 108 can track all changes made on target cluster 104 after the failover. For example, not just read and writes, but deletions, metadata changes, policy changes, etc., can be tracked on the target cluster post failover by sync component 108. Upon failing back to the source cluster, the change log generated by the target cluster after failover can be processed by the source cluster. Newly created files from the target cluster can be associated with a new source LIN after the data is written to the source cluster. Sync component 106 on the source cluster and target cluster 104 can effectively map the newly created source LIN to the target LIN replacing the placeholder source LIN in the target cluster reverse LIN mapping table.

It can be appreciated that implementations as disclosed herein and in the associated figures are not limited to Internet Protocol version 4 "IPv4" (e.g., Ethernet) addresses and can also be implemented using IPv6, an internet layer protocol that provides 128 bit addresses.

It can be appreciated that implementations as disclosed herein are not limited to avoiding the remounting of an NFS export on a target cluster after a failover trigger, and can also support Remote Direct Memory Access ("RDMA") implementations that have a similar "mount" phase to NFS transactions, by preventing the need to remount RDMA mechanisms on the target cluster.

Figure 3:
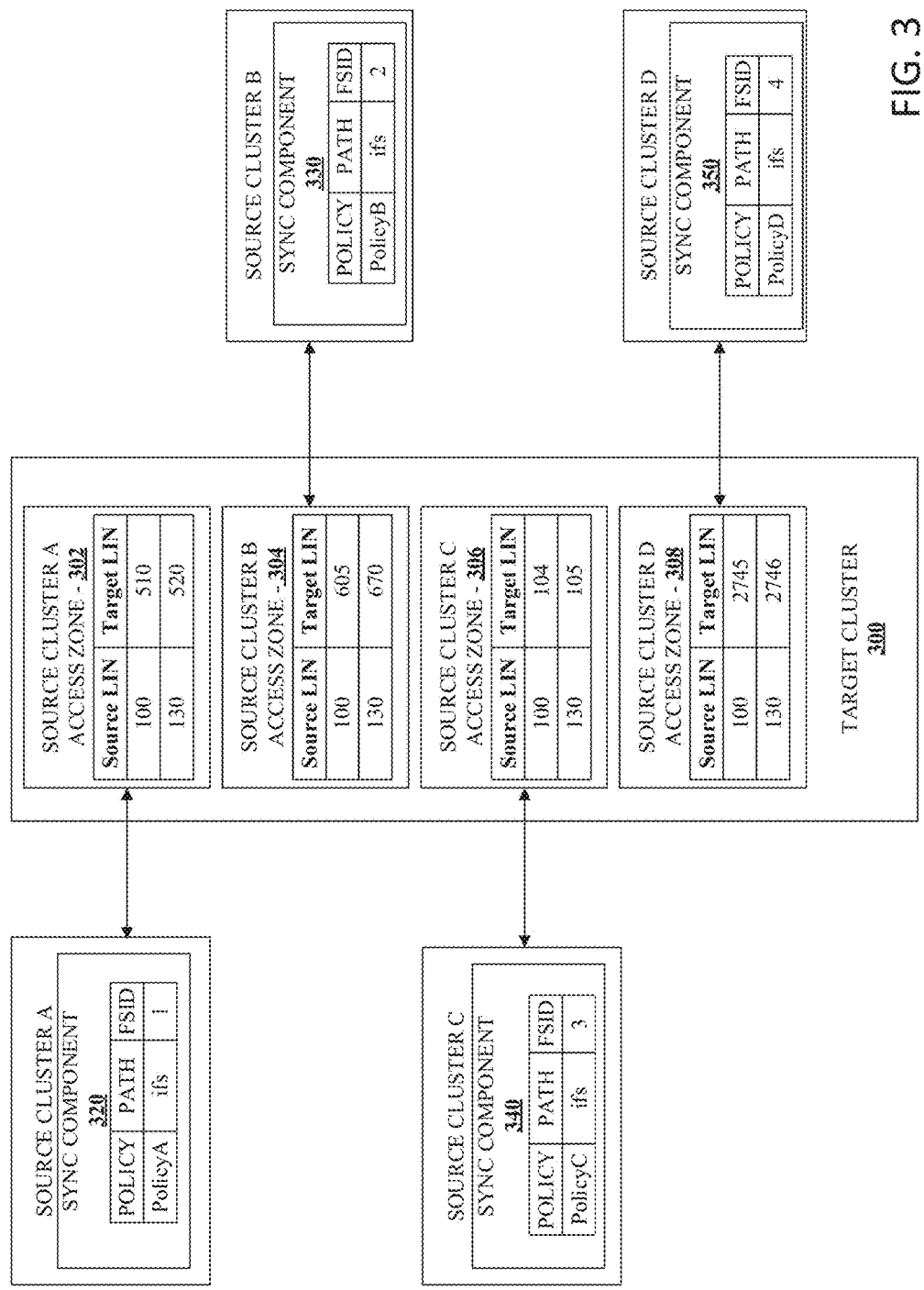
FIG. 3 illustrates an example target cluster as a failover target to a set of source clusters in accordance with implementations of this disclosure.

Referring now to FIG. 3, there is illustrated an example target cluster as a failover target to a set of source clusters in accordance with implementations of this disclosure. In one implementation, multiple source clusters can failover to a single target cluster. It can be appreciated that each source cluster (e.g., source clusters A, B, C, and D) can be running independently of each other and servicing different sets of clients. At any point in time, one source cluster or subset of the set of source clusters can independently fail over to the target cluster. Each source cluster access zone in target cluster 300 can be associated with a unique FSID (mirrored by the respective source cluster) that is associated with a dynamic IP address used originally be the set of clients to connect to each respective source cluster. In one example, source cluster A can failover to access zone 302 on target cluster 300. Access zone 302 can establish the same dynamic IP address and FSID (e.g., FSID 1) associated with the access zone syncing from source cluster A. Similarly, source cluster B can failover to source cluster B access zone 304 in target 300, source cluster C can failover to source cluster C access zone 306 in target 300, and source cluster D can failover to source cluster D access zone 308 in target 300. As shown in FIG. 3, each of the source clusters can use common LIN's unique to their own source cluster; however, because the target cluster 300 has separate reverse LIN maps for each access zone within the target cluster, the common LINs among the disparate source clusters will not impact the performance of target cluster 300.

FIGS. 4-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 4:
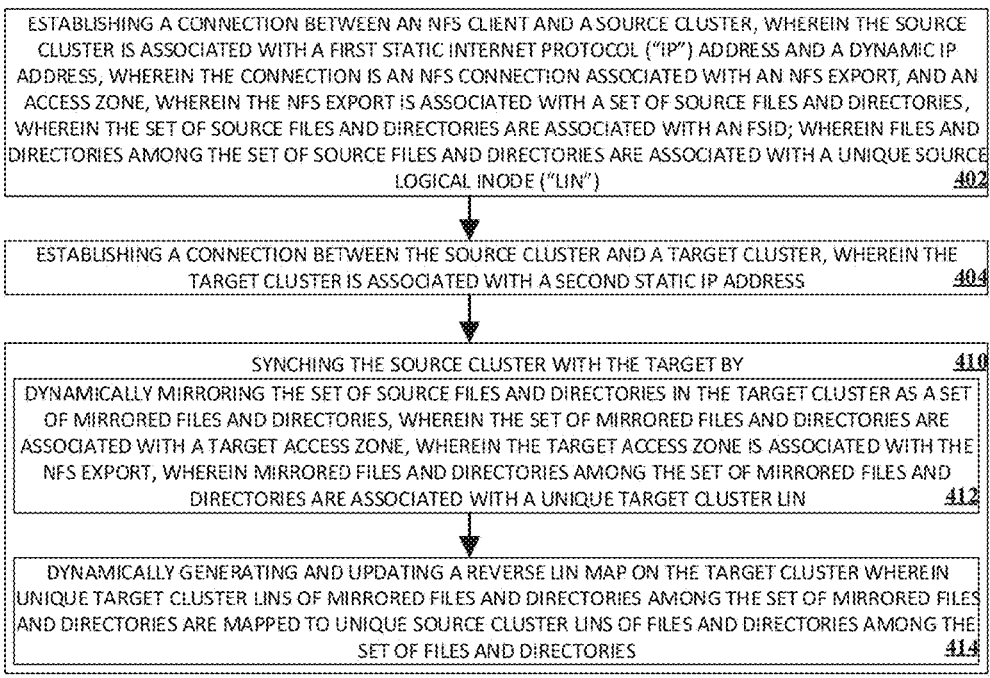
FIG. 4 illustrates an example flow diagram method for linking a source a cluster to a target cluster in preparation of a failover event in accordance with implementations of this disclosure.

FIG. 4 illustrates an example flow diagram method for linking a source a cluster to a target cluster in preparation of a failover event in accordance with implementations of this disclosure.

At 402, a connection can be established between an NFS client and a source cluster, wherein the source cluster is associated with a first static internet protocol ("IP") address and a dynamic IP address, wherein the connection is an NFS connection associated with an NFS export, and an access zone, wherein the NFS export is associated with a set of source files and directories, wherein the set of source files and directories are associated with an FSID; wherein files and directories among the set of source files and directories are associated with a unique source logical mode ("LIN"). In one implementation, the source cluster can be associated with a set of dynamic IP addresses associated with the access zone. It can be appreciated that the access zone is associated with the dynamic IP addresses which allow clients to connect to it, along with a root directory or path of the NFS export that the access zone provides access to NFS clients. In one implementation, in establishing the NFS connection, the source cluster can authenticate the NFS client and issue a token that validates authentication until the token expires or is invalidated. In one implementation, the authentication can involve a prompt given to a user of the NFS client asking for credentials, such as logins, passwords, security questions, biometric signatures, etc. that allow the source cluster to authenticate the NFS client.

At 404, a connection can be established between the source cluster and a target cluster, wherein the target cluster is associated with a second static IP address. It can be appreciated that the source cluster static IP address and the target cluster static IP address can be used to facilitate communication between the source cluster and the target cluster, outside of access zone activity associated with the dynamic IP address.

At 410, the source cluster can be synched to the target cluster by steps 412 and 414. At 412, the set of source files and directories can by dynamically mirrored in the target cluster as a set of mirrored files and directories, wherein the set of mirror files and directories are associated with a target access zone, wherein the target access zone is associated with the NFS export, wherein mirrored files and directories among the set of mirrored files and directories are associated with a unique target cluster LIN. It can be appreciated that not only file data but metadata, access zone configuration data, sync policy data, authentication process data, etc. can be synched. In one implementation, the access zone configuration data, authentication process data can be synced manually via a user or an administrator. At 414, a reverse LIN map can be dynamically generated and updated on the target cluster wherein unique target cluster LINs of mirrored files and directories among the set of mirrored files are directories are mapped to unique source cluster LINs of files and directories among the set of files and directories.

In one implementation, syncing the source cluster is based on a sync policy associated with the access zone.

In one implementation, the dynamically mirroring the set of source files and directories in the target cluster is based on incremental snapshots by the source cluster. In one implementation, the snapshot method is copy on write snapshots. It can be appreciated that a unique snapshot can be created on the source cluster that encompasses all the files within the NFS export specifically for the purpose of syncing the files to a target cluster. Upon first syncing the files between the source cluster and the target cluster, the entire path can be mirrored to the target cluster, and in subsequent dynamic sync operations, iterative snapshot processes can identify any newly added data to the source cluster that necessitates mirroring onto the target cluster.

Figure 5:
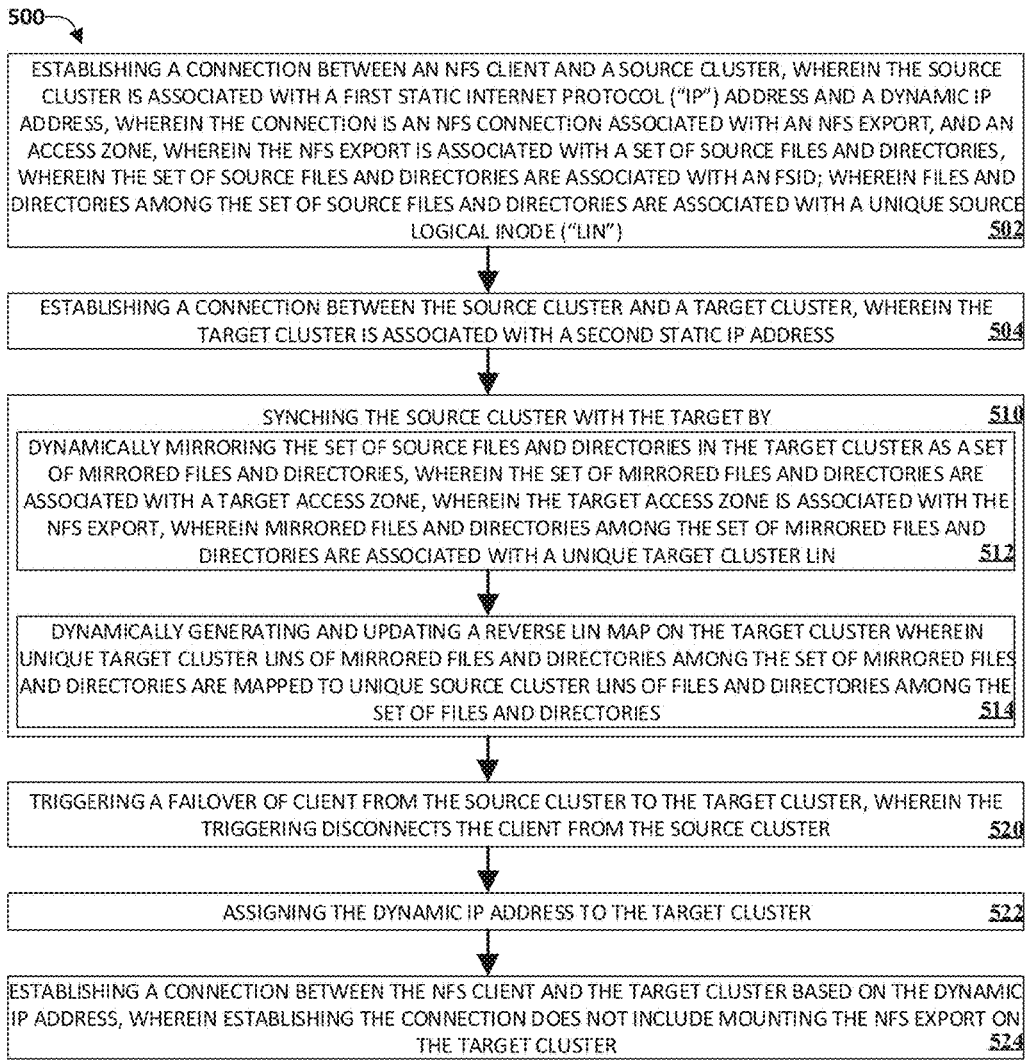
FIG. 5 illustrates an example flow diagram method for an NFS failover from a source cluster to a target cluster in accordance with implementations of this disclosure.

FIG. 5 illustrates an example flow diagram method for an NFS failover from a source cluster to a target cluster in accordance with implementations of this disclosure. Steps 502-514 are the same as steps 402-414 as described above. At 520, a failover of the client from the source cluster to the target cluster can be triggered, wherein the triggering disconnects the client from the source cluster. As discussed supra, there are multiple means of disconnecting the source cluster from serving NFS clients at the dynamic IP address. It can be appreciated that in some implementations, it may be necessary to prevent any node from the source cluster from honoring requests to the dynamic IP address. At 522, the dynamic IP address can be assigned to the target cluster. It can be appreciated that the dynamic IP address is associated with an access zone on the target cluster that is a mirror of the source cluster access zone, additionally including, at least, the reverse LIN map data.

At 524, a connection between the NFS client and the target cluster can be established based on the dynamic IP address, wherein establishing the connection does not include mounting the NFS export on the target cluster. It can be appreciated that the NFS export can be mounted to the target cluster prior to syncing of data between the source cluster and the target cluster; however, upon the triggering of the failover event, the NFS export does not need to be mounted again on the target cluster. The FSID associated with the target cluster access zone can be the same FSID associated with the source cluster access zone. In conjunction with the connection between the NFS client and the target cluster, the target cluster access zone can become writable, such that, at least any client requests are first mapped to target LINs from source LINs using the reverse LIN map.

Figure 6:
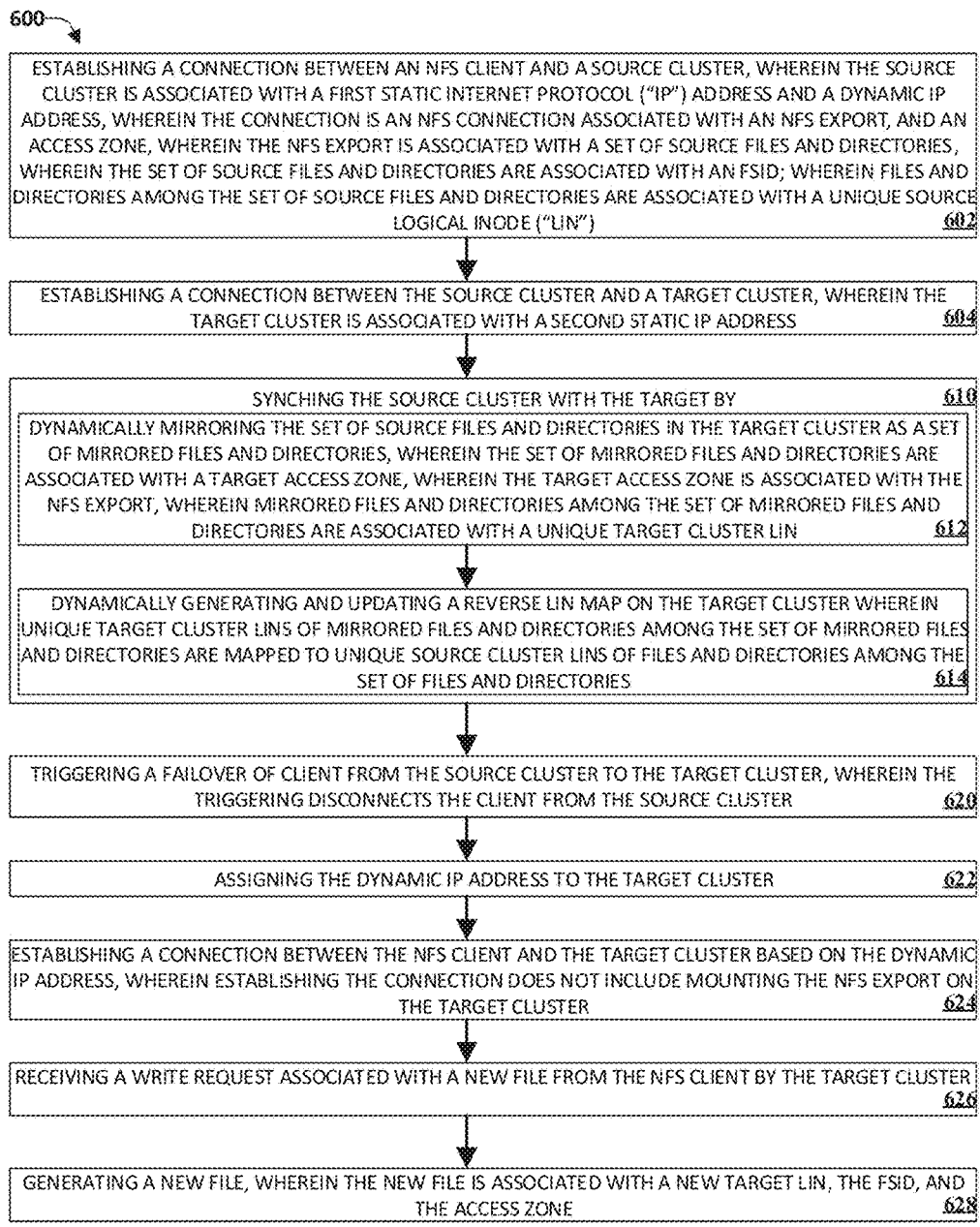
FIG. 6 illustrates an example flow diagram method for an NFS client requesting a write on a target cluster after a failover event in accordance with implementations of this disclosure.

FIG. 6 illustrates an example flow diagram method for an NFS client requesting a write on a target cluster after a failover event in accordance with implementations of this disclosure. Steps 602-624 are the same as steps 502-524 as described above. At 626, a write request associated with a new file can be received from the NFS client by the target cluster. At 628, a new file can be generated, wherein the new file is associated with a new target LIN, the FSID, and the access zone. The method also provides for honoring write requests associated with existing files. It can be appreciated that a write request associated with an existing file may first process a read of the file data as described with regard to FIG. 7. It can be further appreciated that data that is overwritten can be done so in a manner that continues to honor existing snapshots, and other data protection processes, on the dataset. For example, if a user on the source cluster established a snapshot on a file prior to a failover event, and post-failover, a user modified that file by overwriting portions of the file data, the original file data will not be lost. In one implementation, the original file data exists on the source cluster and during a failback, a change log can be processed on the source cluster (see detailed explanation in regards to FIG. 8 below) such that any changes to the files on the target cluster can be processed while honoring any data protection processes associated with the access zone, including active snapshots. In another implementation, data protection processes existing on the source cluster access zone are mirrored on the target cluster access zone, and are honored on the target cluster at the time of processing the operation.

Figure 7:
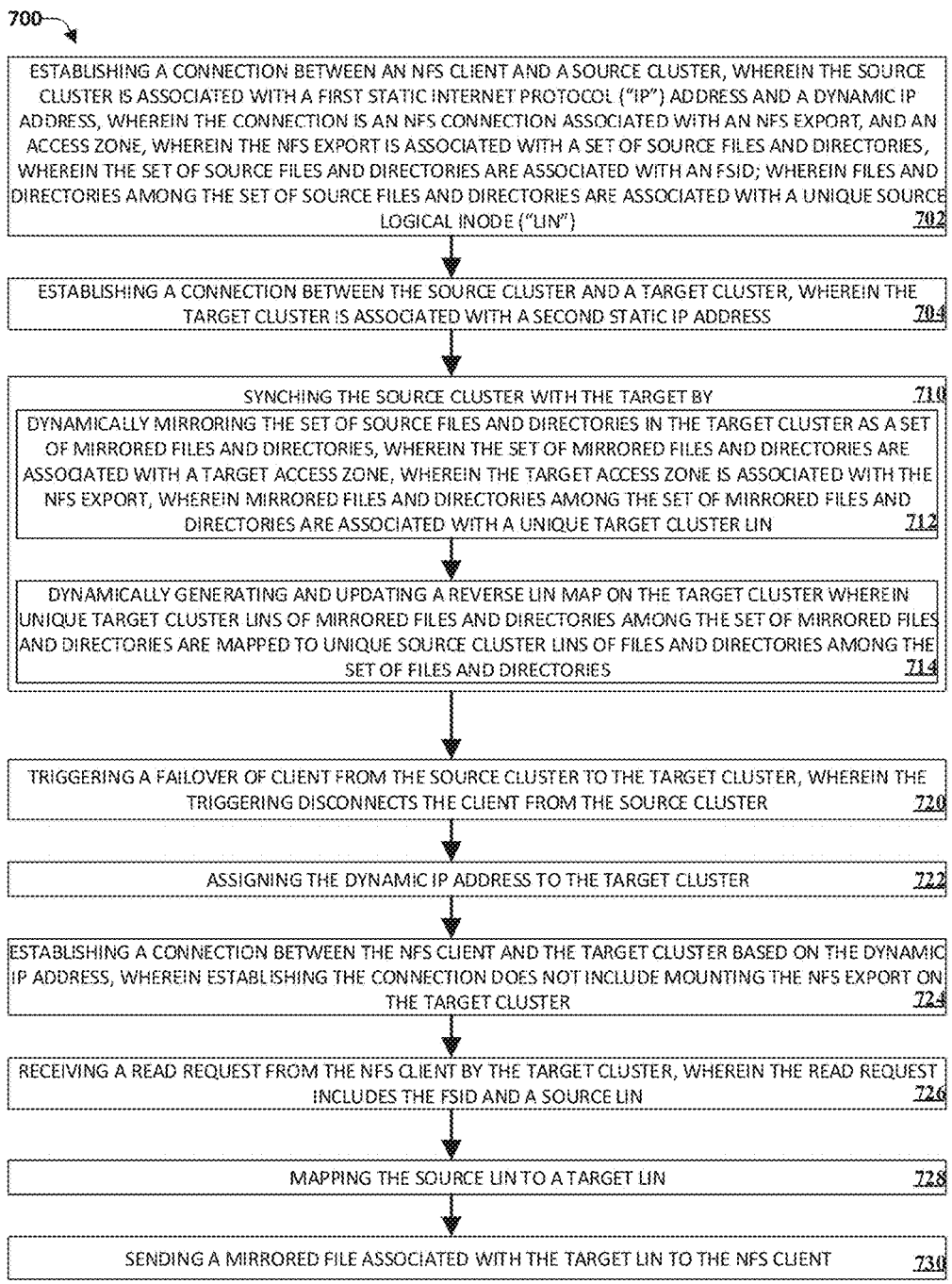
FIG. 7 illustrates an example flow diagram method for an NFS client requesting a read on a target cluster after a failover event in accordance with implementations of this disclosure.

FIG. 7 illustrates an example flow diagram method for an NFS client requesting a read on a target cluster after a failover event in accordance with implementations of this disclosure. Steps 702-724 are the same as steps 502-524 as described above. At 726, a read request can be received from the NFS client by the target cluster, wherein the read request includes the FSID and a source LIN. At 728, the source LIN can be mapped to a target LIN. At 730, a mirrored file associated with the target LIN can be sent to the NFS client.

Figure 8:
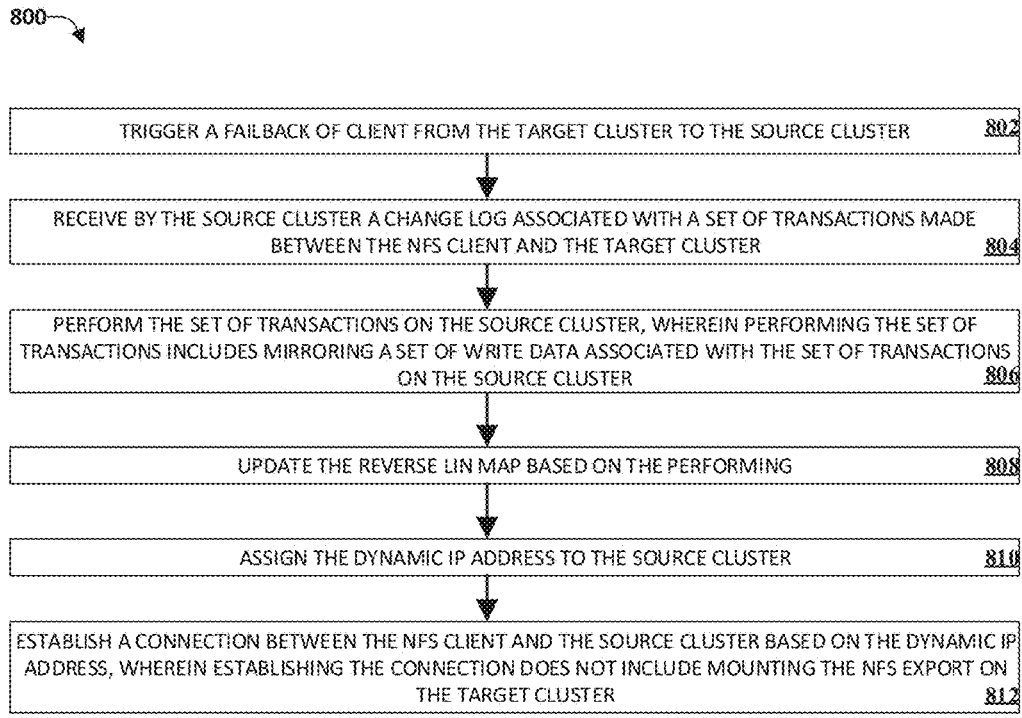
FIG. 8 illustrates an example flow diagram method of a failback from a target cluster to a source cluster in accordance with implementations of this disclosure.

FIG. 8 illustrates an example flow diagram method of a failback from a target cluster to a source cluster in accordance with implementations of this disclosure. At 802, a failback can be triggered to failback the client from the target cluster to the source cluster. For example, a failback can be initiated where after a failover to a target cluster, the source cluster can become available again, and the clients can failback to the source cluster. The trigger can be associated with the source cluster becoming available, available target cluster resources to continue performing failover work, a predetermined time period, an administrator prompt, etc.

At 804, the course cluster can receive a change log associated with a set of transactions made between the NFS client and the target cluster. It can be appreciated that the change log can track all transactions made on the target cluster after the failover including transactions performed for the plurality of clients connected to the target cluster NFS failover access zone. For example, not just read and writes, but deletions, metadata changes, policy changes, etc., can be tracked on the target cluster post failover. In one implementation, for any files created in the target cluster after the failover, a target LIN is created for the file and the mapping information is updated to include a placeholder source LIN that matches the target LIN, such that any future client request to the target cluster referencing a the placeholder source LIN is mapped to the newly generated target LIN.

In one implementation, a failover revert can be triggered where changes on the target cluster during failover are discarded, and the source cluster reverts back to the last known stable sync state on the source cluster.

At 806, the set of transactions can be performed on the source cluster, wherein performing the set of transactions includes mirroring a set of write data associated with the set of transactions on the source cluster. Newly created files from the target cluster can be associated with a new source LIN after the data is written to the source cluster.

At 808, the reverse LIN map can be updated based on the performing in step 808. The source cluster and target cluster can effectively map the newly created source LIN to the target LIN replacing the placeholder source LIN in the target cluster reverse LIN mapping table.

At 810, the dynamic IP address can be reassigned to the source cluster. For example, the source cluster prior to the failover was honoring requests to the NFS access zone based on the dynamic IP address, that IP address was later assigned to the failover NFS access zone on the target cluster during the failover, and can now revert back to the original source cluster access zone during the failback.

At 812, a connection can be established between the NFS client and the source cluster based on the dynamic IP address, wherein establishing the connection does not include mounting the NF export on the target cluster.

Figure 9:
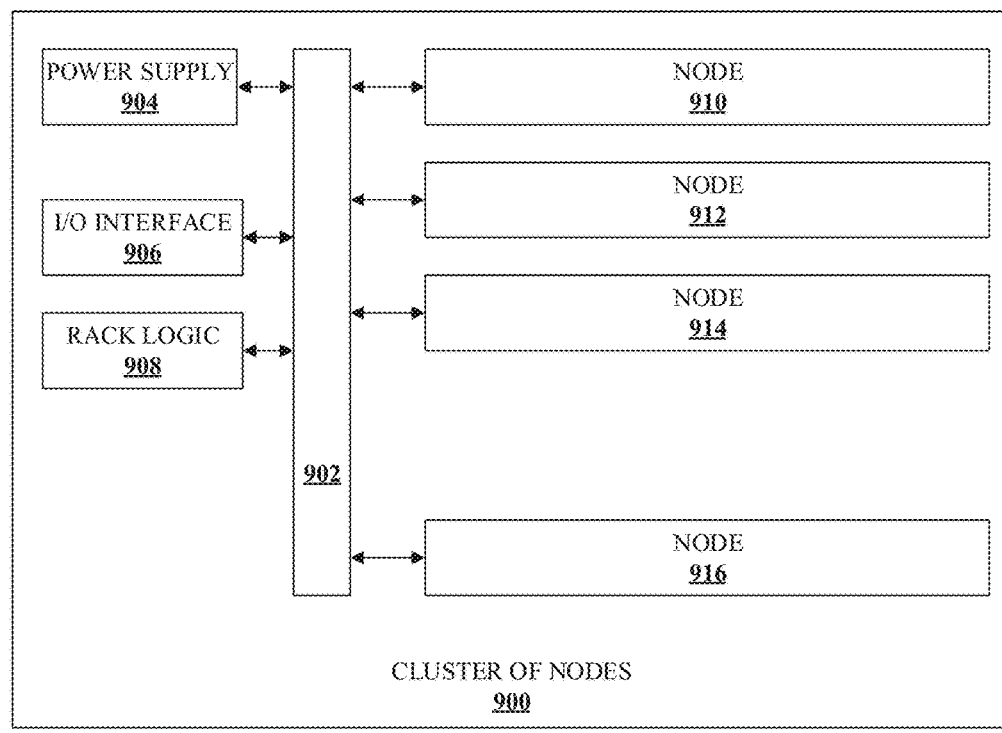
FIG. 9 illustrates an example block diagram of rack of blade servers in accordance with implementations of this disclosure.

FIG. 9 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 910, 912, 914 and 916 operating in a cluster; however, it can be appreciated that more or less nodes can make up a cluster. It can be further appreciated that nodes among the cluster of nodes do not have to be in a same enclosure as shown for ease of explanation in FIG. 9, and can be geographically disparate. Backplane 902 can be any type of commercially available networking infrastructure that allows nodes among the cluster of nodes to communicate amongst each other in as close to real time as the networking infrastructure allows. It can be appreciated that the backplane 902 can also have a separate power supply, logic, I/O, etc. as necessary to support communication amongst nodes of the cluster of nodes.

As shown in the figure, enclosure 900 contains at least a power supply 904, an input/output interface 906, rack logic 908, several blade servers 910, 912, 914, and 916, and backplane 902. Power supply 904 provides power to each component and blade server within the enclosure. The input/output interface 906 provides internal and external communication for components and blade servers within the enclosure. Backplane 908 can enable passive and active communication of power, logic, input signals, and output signals for each blade server.

It can be appreciated that the Cluster of nodes 900 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 10:
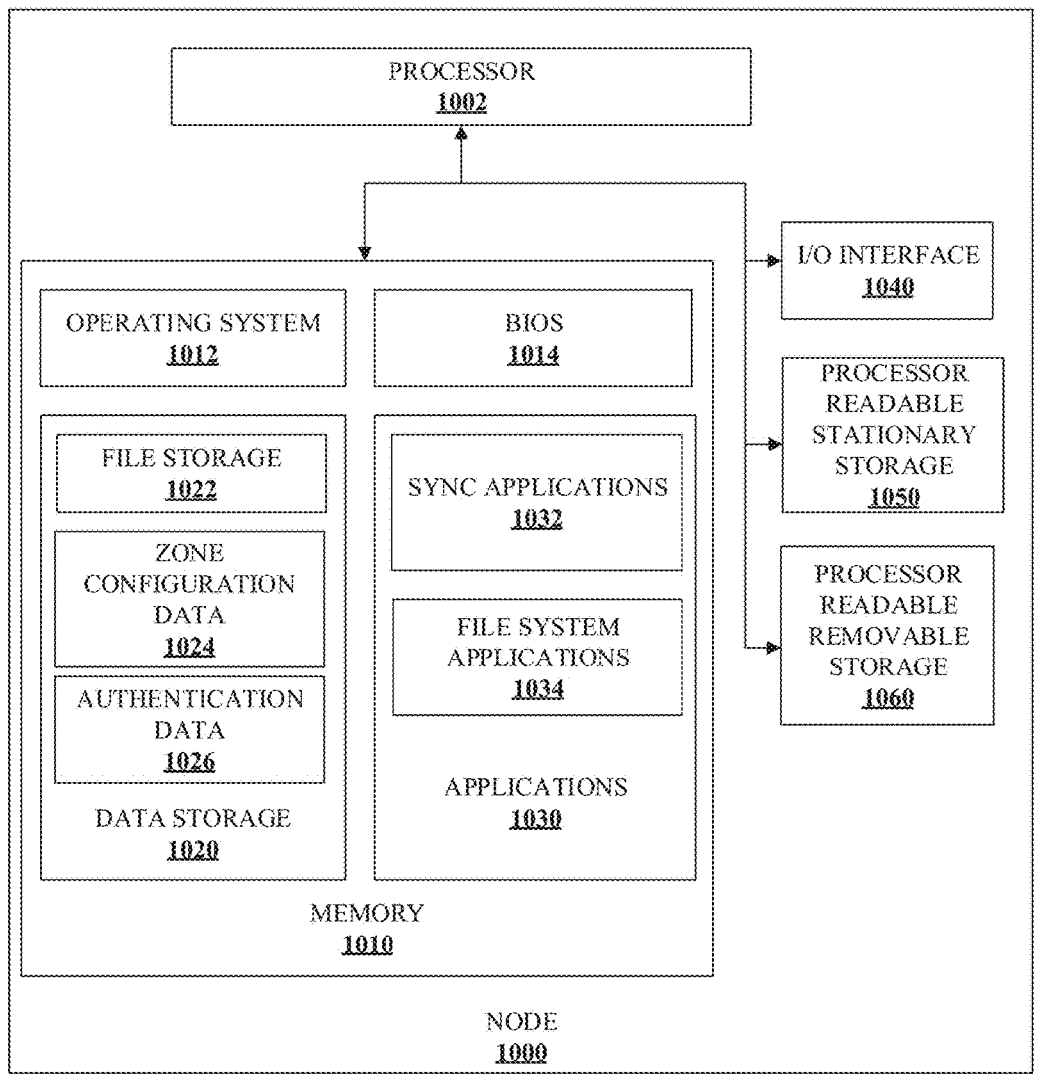
FIG. 10 illustrates an example block diagram of a blade server in accordance with implementations of this disclosure.

FIG. 10 illustrates an example block diagram of a blade server 1000 in accordance with implementations of this disclosure. As shown in FIG. 9, a plurality of blade servers may be included in one enclosure that shares resources provided by the enclosure to reduce size, power, and cost.

Node 1000 includes processor 1002 which communicates with memory 1010 via a bus. Node 1000 also includes input/output interface 1040, processor-readable stationary storage device(s) 1050, and processor-readable removable storage device(s) 1060. Input/output interface 1040 can enable node 1000 to communicate with other nodes, mobile devices, network devices, and the like. Processor-readable stationary storage device 1050 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1060 enables processor 1002 to read non-transitive storage media for storing and accessing processor-readable instructions, modules, data structures, and other forms of data. The non-transitive storage media may include Flash drives, tape media, floppy media, disc media, and the like.

Memory 1010 may include Random Access Memory (RAM), Read-Only Memory (ROM), hybrid of RAM and ROM, and the like. As shown, memory 1010 includes operating system 1012 and basic input/output system (BIOS) 1014 for enabling the operation of blade server 1000. In various embodiments, a general-purpose operating system may be employed such as a version of UNIX, LINUX™, a specialized server operating system such as Microsoft's Windows Server™ and Apple Computer's OS X, or the like.

Applications 1030 may include processor executable instructions which, when executed by node 1000, transmit, receive, and/or otherwise process messages, audio, video, and enable communication with other networked computing devices. Examples of application programs include database servers, file servers, calendars, transcoders, and so forth. Applications 1030 may include, for example, file system application 1034, and sync applications 1032 according to implementations of this disclosure. For example, an application to sync a source cluster and a target cluster can be used by a user or administrator to establish a new access zone sync, associate the access zone with a network interface, associate a snapshot set or subset for syncing, managing sync policies, etc. It can be appreciated that a UI for such application can exists, such as within a web UI for the distributed file system as a whole.

Human interface components (not pictured), may be remotely associated with blade server 1000, which can enable remote input to and/or output from blade server 1000. For example, information to a display or from a keyboard can be routed through the input/output interface 1040 to appropriate peripheral human interface components that are remotely located. Examples of peripheral human interface components include, but are not limited to, an audio interface, a display, keypad, pointing device, touch interface, and the like.

Data storage 1020 may reside within memory 1010 as well, storing file storage 1022 data such as metadata or LIN data. It can be appreciated that LIN data and/or metadata can relate to rile storage within processor readable stationary storage 1050 and/or processor readable removable storage 1060. For example, LIN data may be cached in memory 1010 for faster or more efficient frequent access versus being stored within processor readable stationary storage 1050. In addition, Data storage 1020 can also host zone data 204 and token data 206 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    establishing a connection between an NFS client and a source cluster, wherein the source cluster is associated with a first static internet protocol ("IP") address and a dynamic IP address, wherein the connection is an NFS connection associated with an NFS export, and an access zone, wherein the NFS export is associated with a set of source files and directories, wherein the set of source files and directories are associated with an FSID; wherein files and directories among the set of source files and directories are associated with a unique source logical mode ("LIN");
    establishing a connection between the source cluster and a target cluster, wherein the target cluster is associated with a second static IP address;
    syncing the source cluster with the target by:
        dynamically mirroring the set of source files and directories in the target cluster as a set of mirrored files and directories, wherein the set of mirror files and directories are associated with a target access zone, wherein the target access zone is associated with the NFS export, wherein mirrored files and directories among the set of mirrored files and directories are associated with a unique target cluster LIN; and
        dynamically generating and updating a reverse LIN map on the target cluster wherein unique target cluster LINs of mirrored files and directories among the set of mirrored files and directories are mapped to unique source cluster LINs of files and directories among the set of files and directories;
    triggering a failover of client from the source cluster to the target cluster, wherein the triggering disconnects the client from the source cluster;
    assigning the dynamic IP address to the target cluster; and
    establishing a connection between the NFS client and the target cluster based on the dynamic IP address, wherein establishing the connection does not include mounting the NFS export on the target cluster.

2. The method of claim 1, wherein the syncing the source cluster is based on a sync policy associated with the access zone.

3. The method of claim 1, wherein the dynamically mirroring the set of source files and directories in the target cluster is based on incremental snapshots by the source cluster.

4. The method of claim 1, further comprising:
    receiving a read request from the NFS client by the target cluster, wherein the read request includes the FSID and a source LIN;
    mapping the source LIN to a target LIN; and
    sending a mirrored file associated with the target LIN to the NFS client.

5. The method of claim 1, further comprising:
    receiving a write request associated with a new file from the NFS client by the target cluster; and
    generating a new file, wherein the new file is associated with a new target LIN, the FSID, and the access zone.

6. The method of claim 1, further comprising:
    triggering a failback of client from the target cluster to the source cluster;
    receiving by the source cluster a change log associated with a set of transactions made between the NFS client and the target cluster;
    performing the set of transactions on the source cluster, wherein performing the set of transactions includes mirroring a set of write data associated with the set of transactions on the source cluster;
    updating the reverse LIN map based on the performing;
    assigning the dynamic IP address to the source cluster; and
    establishing a connection between the NFS client and the source cluster based on the dynamic IP address, wherein establishing the connection does not include mounting the NFS export on the target cluster.

7. A non-transitory computer readable storage medium with program instructions stored thereon to perform the following acts:
    establishing a connection between an NFS client and a source cluster, wherein the source cluster is associated with a first static internet protocol ("IP") address and a dynamic IP address, wherein the connection is an NFS connection associated with an NFS export, and an access zone, wherein the NFS export is associated with a set of source files and directories, wherein the set of source files and directories are associated with an FSID; wherein files and directories among the set of source files and directories are associated with a unique source logical mode ("LIN");
    establishing a connection between the source cluster and a target cluster, wherein the target cluster is associated with a second static IP address;
    syncing the source cluster with the target by:
        dynamically mirroring the set of source files and directories in the target cluster as a set of mirrored files and directories, wherein the set of mirror files and directories are associated with a target access zone, wherein the target access zone is associated with the NFS export, wherein mirrored files and directories among the set of mirrored files and directories are associated with a unique target cluster LIN; and
        dynamically generating and updating a reverse LIN map on the target cluster wherein unique target cluster LINs of mirrored files and directories among the set of mirrored files and directories are mapped to unique source cluster LINs of files and directories among the set of files and directories;
    triggering a failover of client from the source cluster to the target cluster, wherein the triggering disconnects the client from the source cluster;
    assigning the dynamic IP address to the target cluster; and
        establishing a connection between the NFS client and the target cluster based on the dynamic IP address, wherein establishing the connection does not include mounting the NFS export on the target cluster.

8. The non-transitory computer readable storage medium of claim 7, wherein the syncing the source cluster is based on a sync policy associated with the access zone.

9. The non-transitory computer readable storage medium of claim 7, wherein the dynamically mirroring the set of source files and directories in the target cluster is based on incremental snapshots by the source cluster.

10. The non-transitory computer readable storage medium of claim 7, further comprising:
receiving a read request from the NFS client by the target cluster, wherein the read request includes the FSID and a source LIN;
mapping the source LIN to a target LIN; and
sending a mirrored file associated with the target LIN to the NFS client.

11. The non-transitory computer readable storage medium of claim 7, further comprising:
receiving a write request associated with a new file from the NFS client by the target cluster; and
generating a new file, wherein the new file is associated with a new target LIN, the FSID, and the access zone.

12. The non-transitory computer readable storage medium of claim 7, further comprising:
triggering a failback of client from the target cluster to the source cluster;
receiving by the source cluster a change log associated with a set of transactions made between the NFS client and the target cluster;
performing the set of transactions on the source cluster, wherein performing the set of transactions includes mirroring a set of write data associated with the set of transactions on the source cluster;
updating the reverse LIN map based on the performing;
assigning the dynamic IP address to the source cluster; and
establishing a connection between the NFS client and the source cluster based on the dynamic IP address, wherein establishing the connection does not include mounting the NFS export on the target cluster.

13. A system comprising at least one storage device and at least one hardware processor configured to:
establish a connection between an NFS client and a source cluster, wherein the source cluster is associated with a first static internet protocol ("IP") address and a dynamic IP address, wherein the connection is an NFS connection associated with an NFS export, and an access zone, wherein the NFS export is associated with a set of source files and directories, wherein the set of source files and directories are associated with an FSID; wherein files and directories among the set of source files and directories are associated with a unique source logical mode ("LIN");
establish a connection between the source cluster and a target cluster, wherein the target cluster is associated with a second static IP address;
sync the source cluster with the target by:
dynamically mirror the set of source files and directories in the target cluster as a set of mirrored files and directories, wherein the set of mirror files and directories are associated with a target access zone, wherein the target access zone is associated with the NFS export, wherein mirrored files and directories among the set of mirrored files and directories are associated with a unique target cluster LIN; and
dynamically generate and update a reverse LIN map on the target cluster wherein unique target cluster LINs of mirrored files and directories among the set of mirrored files and directories are mapped to unique source cluster LINs of files and directories among the set of files and directories;
trigger a failover of client from the source cluster to the target cluster, wherein the triggering disconnects the client from the source cluster;
assign the dynamic IP address to the target cluster; and
establish a connection between the NFS client and the target cluster based on the dynamic IP address, wherein establishing the connection does not include mounting the NFS export on the target cluster.

14. The system of claim 13, wherein the dynamically mirroring the set of source files and directories in the target cluster is based on incremental snapshots by the source cluster.

15. The system of claim 13, further comprising:
receive a read request from the NFS client by the target cluster, wherein the read request includes the FSID and a source LIN;
map the source LIN to a target LIN; and
send a mirrored file associated with the target LIN to the NFS client.

16. The system of claim 13, further comprising:
receive a write request associated with a new file from the NFS client by the target cluster; and
generate a new file, wherein the new file is associated with a new target LIN, the FSID, and the access zone.

17. The system of claim 13, further comprising:
trigger a failback of client from the target cluster to the source cluster;
receive by the source cluster a change log associated with a set of transactions made between the NFS client and the target cluster;
perform the set of transactions on the source cluster, wherein performing the set of transactions includes mirroring a set of write data associated with the set of transactions on the source cluster;
update the reverse LIN map based on the performing;
assign the dynamic IP address to the source cluster; and
establish a connection between the NFS client and the source cluster based on the dynamic IP address, wherein establishing the connection does not include mounting the NFS export on the target cluster.

* * * * *